United States Patent [19]

Ryan et al.

[11] Patent Number: 4,730,385

[45] Date of Patent: Mar. 15, 1988

[54] COAX CONNECTOR INSTALLATION TOOL

[75] Inventors: Michael J. Ryan, Palmdale; David M. Minor, Santa Ana, both of Calif.

[73] Assignee: Lockheed Corporation, Calabasas, Calif.

[21] Appl. No.: 28,839

[22] Filed: Mar. 23, 1987

[51] Int. Cl.[4] ............................................ B23P 19/04

[52] U.S. Cl. ........................................ 29/750; 29/857; 81/125.1

[58] Field of Search .......................... 29/748, 750–754, 29/857, 861; 81/125.1, 487

[56] References Cited

U.S. PATENT DOCUMENTS

| | | | |
|---|---|---|---|
| 599,255 | 2/1898 | Robinson | 81/125.1 |
| 1,024,039 | 4/1912 | Steen | 81/487 |
| 2,453,901 | 11/1948 | Gonsett et al. | 81/125.1 |
| 3,887,981 | 6/1975 | Mazzeo et al. | 29/750 |
| 3,890,028 | 6/1975 | Blanchenot | 29/752 |
| 4,393,583 | 7/1983 | Zwald | 29/857 |

*Primary Examiner*—P. W. Echols
*Attorney, Agent, or Firm*—Louis L. Dachs

[57] ABSTRACT

The invention is a tool to aid in the attaching of coaxial electrical cable ends to a half of a coaxial cable connector assembly. In detail, the tool comprises a wrench to prevent rotation between the connector halves when the connector halves are joined. A shaft is included having a threaded end for coupling to the recess of the other connector half. Finally, a drive preferably in the form of a portable electrical drill, is used to rotate the drive. Thus, with the joined connector halves installed in the wrench, so that rotation therebetween is prevented, the shaft can be threaded into the other connector half and thereafter coupled to the drill. The connector half to which the coaxial cable is to be joined is aligned with the prepared cable end and fed into the threaded recess as the wrench and joined connector halves are rotated.

6 Claims, 5 Drawing Figures

COAX CONNECTOR INSTALLATION TOOL

TECHNICAL FIELD

The invention relates to the field of tools for coupling wires to connectors and, in particular, to a tool for coupling coaxial cables to connectors.

BACKGROUND INFORMATION

Typical coaxial cables (hereinafter called coax cables) comprise a central wire conductors within a tubular insulating layer. Over the tubular insulating layer is a conductive wire sheath, typically in the form of braided wire. An outer insulating cover completes the assembly. The methods most often used ways to join the end of the coax cable to a connector is to first strip the end of the cable to expose a portion of the central conductor, thereafter, stripping away the braided wire sheath exposing the tubular insulating cover and thereafter stripping back a portion of the outer insulating layer exposing a portion of the braided wire sheath. This stripped end is then joined to a connector by inserting the prepared cable end into the connector and thereafter crimp the connector thereto. Another technique is to use a wedge member to hold the braided wire sheath in place. The braided wire sheath is folded back over itself and at the end of the cable is inserted into the connector. A hollow circular wedge member is then threaded into the opening which engages the folded back sheath locking the cable in place, and further providing good electrical contact. Such connectors are commercially available. For example, Automatic Connectors Inc., Commack, N.Y., produces both wedge and crimp type connectors (BNC line of coaxial connectors).

Sometimes a coax cable is installed by just folding back the braided wire sheath over the outer insulation cover and threading the connector directly thereover. This provides an adequate joint for most applications. However, it is sometimes difficult to install the connector over the prepared coax cable end. During the course of a day hand fatigue sets in and the number of connectors that can be installed by this method is limited.

Thus, it is a primary object of the subject invention to provide a tool to aid in the installation of coax cables to connectors.

It is another object of the subject invention to allow the use of power tools to install coax connectors on the end of the coax cables reducing the fatigue of the technician.

DISCLOSURE OF THE INVENTION

The invention is a tool to aid in the attaching of coax electrical cable ends to a connector half of a connector assembly. The coax connectors under consideration are ones which have a threaded recess for receiving the end of the cable. In detail, the tool comprises means to prevent rotation between the connector halves when the connector halves are joined. Preferably, this means comprises a wrench for engaging the respective wrenching flats of the connector halves when the connector halves are joined, thus preventing relative motion therebetween. A shaft means is included having a threaded end for coupling to the recess of the other connector half. Finally, a drive means preferably in the form of a portable electric drill is provided to couple to the drive means.

Thus, with the connector halves connected and installed in the wrench, so that rotation therebetween is prevented, the shaft means is theaded into the other connector half and thereafter coupled to the electric motor. The end of the coax cable is stripped so that the central wire conductor is exposed along with a portion of the tubular insulating layer. The braided wire sheath is exposed and folded back over to extend about the outer insulation cover. The connector half to which the coax cable is to be joined is aligned with the cable end and fed into the threaded recess as the wrench and connector are rotated. This technique provides both a good physical and electrical connection to be made very rapidly. Technician fatigue is reduced to a minimum.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of limits of the invnetion.

BRIEF DESCRIPTION OF THE DRAWINGS

Illustrated in FIG. 1 is a perspective view of the end of a coax cable.

Illustrated in FIG. 2 is a partial cross-sectional side view of the end of the electrical cable prepared for insertion into a connector half.

Figure 3:
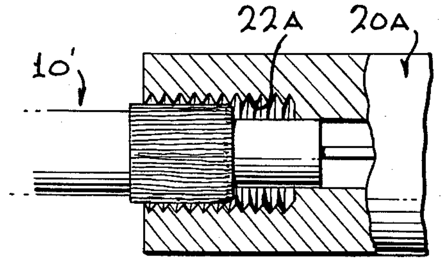

Illustrated in FIG. 3 is a coax cable joined to a connector half.

Figure 4:
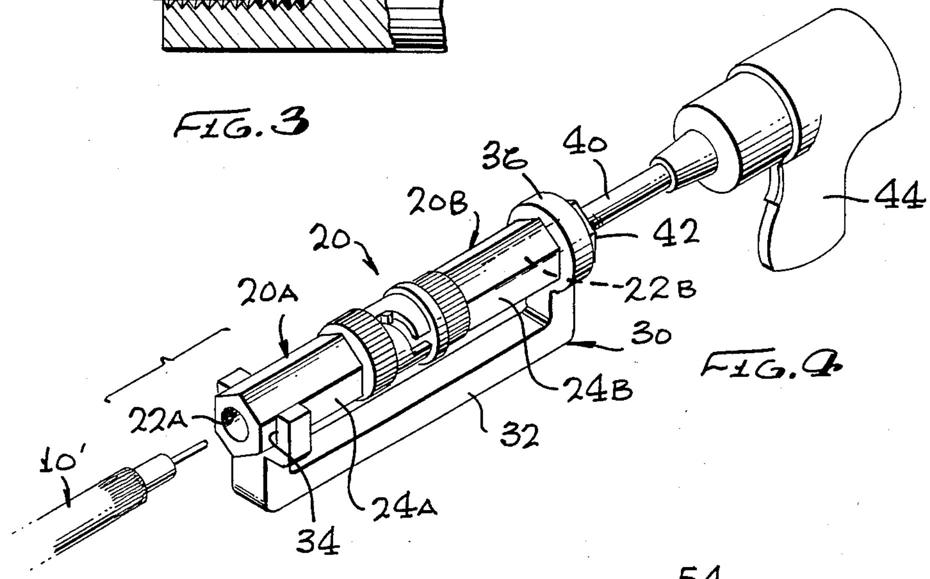

Illustrated in FIG. 4 is a perspective view of the tool assembly having the assembled connector halves mounted therein.

Figure 5:
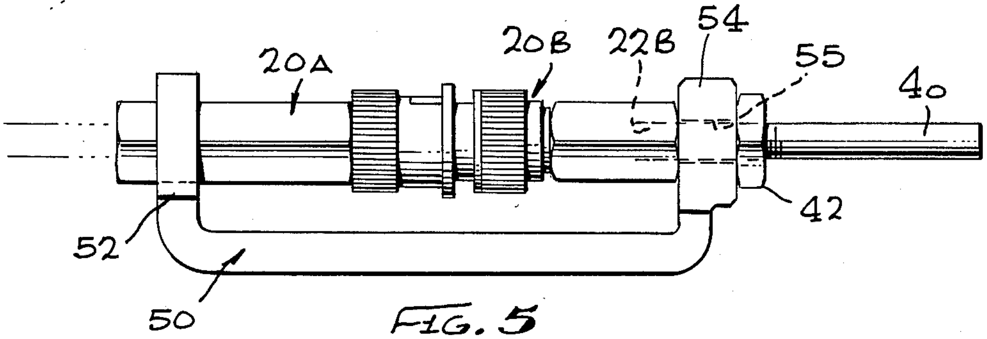

Illustrated in FIG. 5 is a side view of an alternate embodiment of the tool.

BEST MODE FOR CARRYING OUT THE INVENTION

Figure 1:
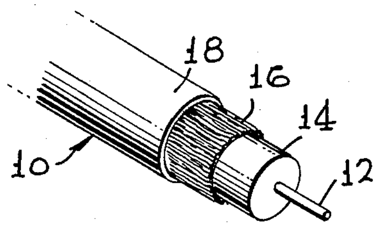
Figure 2:
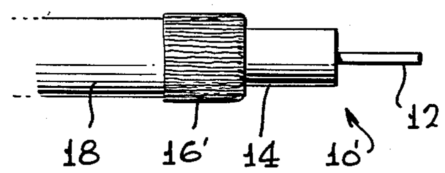

Illustrated in FIG. 1 is a perspective view of the end of a coax cable, partially broken away to show the interior thereof. As can be seen, the end of the cable 10 comprises a central wire conductor 12 mounted within a tubular shaped insulation cover 14. Surrounding the cover 14 is a conductive sheath 16 typically made of braided wire over which is an outer insulation cover 18. Illustrated in FIG. 2 is a side view of an end of a coax cable 10' prepared for coupling to a connector. Here the cable 10' has the sheath 16', folded back over the insulation layer 18 to form a cup. Illustrated in FIG. 3 is the coax cable 10' installed in a female connector half 20A. As illustrated, it is installed into a threaded passage 22 thereof.

Illustrated in FIG. 4 is a perspective view of the too, cable end and connector assembly prior to installation of the cable to the connector half 20A. The connector assembly 20 comprises the previously illustrated female half 20A coupled to the male connector half 20B (note that half 20B also has a threaded recess, indicated by numeral 22B). The connector halves 20A and 20B have a plurality of wrenching flats 24A and 24B. The tool, generally indicated by numeral 30 include a wrench 32 which comprises a bar 32 having an open wrench member 34 on one end and a closed end wrench member 36 on the opposite end. The wrench members 34 and 36 engage the wrenching flats 24A and 24B on the connector halves 20A and 20B, respectively. Thus, with the connector assembly 20 installed therein, relative rotation between the connector halves 20A and 20B is prevented. A threaded shaft 40, threadably engages recess 22B of the connector half 20B, which is locked in place by jam nut 42. A portable power drill 44 is detachably coupled to the opposite end of the shaft.

To install the connector half 20A on the coax cable end 10' the cable end is fed into the threaded recess 22A, the drill 44 is turned on rotating the connector assembly 20 and wrench 30, the cable 10' and the connector half 20A is "threaded" onto the end of the cable 10'. Thus, it can be seen that the wrench "transfers" torque loads around the joint between connector halves preventing damage thereto. Note, that the cable 10' could be attached to the connector half 20B via recess 22B by reversing the positions of the connector halves.

Illustrated in FIG. 6 is an alternate embodiment of the tool. Here the wrench member designated by numeral 50 has an open end wrench member 52, similar to wrench member 34, however, the opposite end comprises a solid flange 54 having an aperture 55 therethrough. The connector half 20B abuts the member 54 with the shaft 40 inserted through the hole 55 and threadably engaging the recess 22B. the hex or jam nut 42 being threadably mounted to the shaft 40 secures the connector half 22B against the member 54. The installation of the cable 10' would be accomplished as in the previous example.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the field of electrical systems and particularly to the installation of connectors on wire ends.

We claim:

1. A tool to aid in the attaching of coaxial electrical cable ends to one of the connector halves of a coaxial cable connector assembly, the connector halves having threaded recesses for receiving the end of the cable, the tool comprising:
   - means to prevent rotation between the connector halves when the connector halves are joined; and
   - drive means having means for engaging one of the threaded recesses of said joined connector halves for causing said joined connector halves to rotate;
   - such that the end of the coaxial cable can be joined to the one connector half by coupling the means to prevent rotation to the jointed connector halves and actuating the drive means, causing said connector halves to rotate while the end of the cable is fed into the recess of the one connector half.

2. The tool as set forth in claim 1, wherein said drive means comprises:
   - a shaft having a threaded end for coupling to the recess of the other connector half; and
   - shaft rotation means for rotating said shaft.

3. The tool as set forth in claim 2 wherein:
   - said connector halves have wrenching flats thereon and
   - said means to prevent rotation between the connector halves when the connector halves are joined comprises wrenching means for engaging the respective wrenching flats of the connector halves when said connector halves are joined.

4. The tool as set forth in claim 3 wherein said wrenching means comprises:
   - a bar having first and second ends;
   - first and second wrenching members mounted to said first and second ends of said bar, respectively in aligned relationship spaced from each other a sufficient distance such that when said connector halves are joined said first wrenching member engages the wrenching flats on the one connector half and the second wrenching member engages the wrenching flats on the other connector half.

5. The tool as set forth in claim 4 wherein said first wrenching member is an open end and the second wrenching member is a closed end.

6. The tool as set forth in claim 5 wherein said shaft rotation means is an electrical drill adapted to grip the opposite end of said shaft.

* * * * *